United States Patent [19]
Brett

[11] Patent Number: 5,282,683
[45] Date of Patent: Feb. 1, 1994

[54] FLUID-TEMPERATURE TESTING ASSEMBLY

[75] Inventor: Richard L. Brett, Roswell, Ga.

[73] Assignee: Liquid Crystal Sciences, Inc., Atlanta, Ga.

[21] Appl. No.: 985,310

[22] Filed: Dec. 4, 1992

[51] Int. Cl.$^5$ .................. G01K 1/14; G01K 11/12; G01K 13/12

[52] U.S. Cl. .................. 374/150; 128/736; 128/771; 374/157; 374/162

[58] Field of Search .............. 374/150, 157, 162, 208; 128/771, 736

[56] References Cited

U.S. PATENT DOCUMENTS

| | | | |
|---|---|---|---|
| Re. 33,686 | 9/1991 | Parrish | 128/771 |
| 2,319,101 | 5/1943 | Anderson | 374/150 |
| 2,357,477 | 9/1944 | Killman | 374/150 |
| 3,559,484 | 2/1971 | Kita | 374/150 |
| 3,696,675 | 10/1972 | Gilmour | 374/162 |
| 3,864,976 | 2/1975 | Parker | 374/150 |
| 4,408,905 | 10/1983 | Ehrenkranz | 374/157 |
| 4,464,064 | 8/1984 | D'Luzansky | 374/162 |
| 4,538,926 | 9/1985 | Chretien | 374/162 |
| 4,564,299 | 1/1986 | Ehrenkranz | 374/157 |
| 4,769,215 | 9/1988 | Ehrenkranz | 422/58 |
| 4,878,588 | 11/1989 | Ephraim | 374/150 |
| 4,973,170 | 11/1990 | Bescherer et al. | 374/208 |

FOREIGN PATENT DOCUMENTS

| | | | |
|---|---|---|---|
| 0964183 | 5/1957 | Fed. Rep. of Germany | 374/157 |
| 2639101 | 3/1978 | Fed. Rep. of Germany | 374/150 |
| 2426249 | 1/1980 | France | 374/150 |

OTHER PUBLICATIONS

Copy of front and back packaging for "Tetra Coral Lite" thermometer, American Thermometer Co., Inc., Dayton, Ohio. (No Date).

Primary Examiner—William A. Cuchlinski, Jr.
Assistant Examiner—Diego F. F. Gutierrez
Attorney, Agent, or Firm—Louis T. Isaf

[57] ABSTRACT

Method and an apparatus for, in the most preferred embodiment, measuring the temperature of liquid, such as urine, contained in a container using a new thermometer, referred to herein as a thermometer insert, including, at least, a thermal scale member mounted to an elongated backing member. The elongated backing member is resilient and "springs" back to its normally flat condition if bent. The thermal scale member includes an temperature indication region and numeric temperature indicia, and senses and indicates the temperature of the liquid in the container. The thermometer insert is placed into the container either before or after the liquid is deposited into the container. The thermometer insert and the wall of the container cooperate to hold the thermometer insert in engagement with the container wall so that the thermal scale member is capable of being observed through the container wall. After being used, the container, with the thermometer insert therein, can be reused or discarded. Alternatively, the thermometer insert is capable of being removed from the container so that either the thermal scale member or the container can be reused.

2 Claims, 1 Drawing Sheet

FLUID-TEMPERATURE TESTING ASSEMBLY

BACKGROUND OF THE INVENTION

The present invention relates generally to the field of temperature measurement, and, in its most preferred embodiments, to the temperature measurement of liquid in a container.

Thermometers have been used to measure a variety of liquids in containers. One type of liquid currently being subjected to frequent scrutiny is urine. Studies have shown that the temperature of freshly voided urine can provide a good, less intrusive indication of core body temperature, thus providing for the detection of body temperature changes due to such causes as fever or ovulation. Furthermore, because of an increase in public awareness of drug abuse among people in many different areas of society, many organizations have initiated drug testing programs which analyze urine specimens. To help ensure the genuineness of a urine specimen, a thermometer is routinely used to verify that the temperature of the urine specimen approximates normal body temperature. The processes and devices heretofore used to determine urine specimen temperatures all suffer from a variety of potential problems.

U.S. Pat. No. 4,832,046, reissued as Re. No. 33,686 to James M. Parrish, discloses a method and an apparatus for collecting and detecting spurious urine samples. The Parrish patent discloses, as one embodiment, a single use urine collection container having an irreversible temperature sensitive member adhesively connected to the exterior of the collection container at a height below the level of the urine sample. The exterior temperature sensitive member is not necessarily acceptable in all testing situations. For example, some urine collection containers are constructed of plastic, a material normally having relatively low conductivity. One apparent consequence of poor conductivity is that the temperature sensitive member needs to be placed below the level of urine sample to ensure proper heat conduction through the collection container to the temperature sensitive member to obtain a proper temperature reading. Peculiar positioning problems may arise when only a small amount of urine is collected, assuming the collection container will accurately conduct the heat of a small amount of urine. Furthermore, the low conductivity increases the need for a very firm and thorough contact between the temperature sensitive member and the collection container, thus magnifying the consequences of improper affixation. Moreover, the collection container material may also introduce an unacceptable time delay in the heat transfer from the urine to the temperature sensitive member.

Furthermore, the method and apparatus disclosed by the Parrish patent do not appear to foster equipment reuse. Obviously it would be difficult to reuse the irreversible temperature sensitive member. It would also be difficult to reuse the temperature sensitive member on another collection container even if it were not irreversible because an adhesive connects the temperature sensitize member to the collection container. Successive removal and reapplication of the temperature sensitive member is likely to degrade the adhesive and the thermal contact between the temperature sensitive member and the collection container. Such degradation is likely to result in spurious temperature indications. Thermal contact is also likely to be degraded if additional adhesive is successively applied and allowed to build up between the temperature sensitive member and the collection container.

In conclusion, with respect to the method and apparatus disclosed in the Parrish patent, adhesively attaching a temperature sensitive member to the exterior of a collection container having relatively low conductivity presents many potential problems.

There is, therefore, a need in the industry for a method and apparatus which solves these and other related, and unrelated, problems.

SUMMARY OF THE INVENTION

Briefly described, the present invention comprises a fluid-temperature testing assembly which includes, in its most preferred embodiment, a container and a thermometer insert that removably engages the inner wall of the container. The container is, for example, a cylindrical container having a container wall defining a container cavity, and a container opening providing access to the container cavity. The thermometer insert includes a thermal scale member affixed to an elongated backing member. The elongated backing member is resilient and biased toward a flat configuration. The length of the backing is greater than the container diameter.

According to the preferred method of the present invention, the thermometer insert is used by bending it, placing it through the container opening into the container cavity, properly orienting it, and releasing it. Once the thermometer insert is released the resilient backing attempts to return to its normally flat condition. However, since the length of the resilient backing is greater than the container diameter, the container wall restricts the backing and the thermometer insert engages the container wall. The interaction between the container wall and the thermometer insert causes the thermometer insert to abut the container wall. The thermometer insert is capable of being in direct contact with liquid in the container and is observed through the container wall to obtain a temperature reading of the liquid. In accordance with the preferred embodiment of the present invention, the container contains a urine specimen and the temperature of the urine specimen is obtained. The thermometer insert is capable of being placed into the container either before or after the urine specimen is placed into the container. Once a temperature measurement is made, the thermometer insert is capable of being reused within the same container or removed and used in another container, or removed and discarded.

The scope of the present invention includes thermometer inserts of various alternate embodiments for use with various types of containers and container contents.

It is therefore, an object of the present invention is to provide a method and apparatus for measuring the temperature of a fluid which feature ease of use, efficiency, consistency, and reliability.

Another object of the present invention to provide a new thermometer device to provide a method and apparatus for measuring the temperature of container contents.

Yet another object of the present invention is to provide a thermometer insert and a method of using the thermometer insert.

Still another object of the present invention is to provide a method and apparatus for helping a tester detect a fraudulent urine specimen.

Still another object of the present invention is to provide a method and apparatus for measuring urine temperature which do not notify a patient of temperature measurement.

Still another object of the present invention is to provide a method and apparatus for measuring the temperature of a urine specimen which provides accuracy by placing the thermometer insert in direct contact with the urine specimen.

Still another object of the present invention is to provide a method and apparatus for measuring the temperature of urine and other fluid specimens through providing a disposable testing apparatus.

Still another object of the present invention is to provide a method and apparatus for measuring the temperature of urine and other fluid specimens through providing a reusable testing apparatus.

Other objects, features and advantages of the present invention will become apparent upon reading and understanding this specification, taken in conjunction with the accompanying drawings.

DETAILED DESCRIPTION OF THE PREFERRED EMBODIMENT

Figure 1:
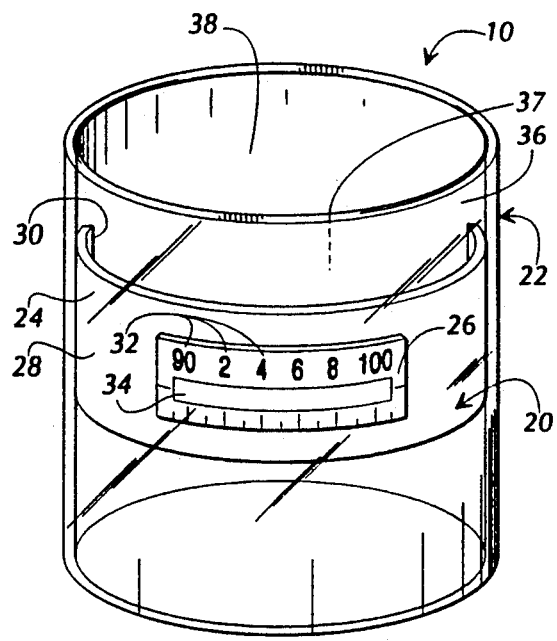
FIG. 1 is a perspective front view of a fluid-temperature testing assembly, in accordance with the preferred embodiment of the present invention.

Referring now in greater detail to the drawings, in which like numerals represent like components throughout the several views, FIG. 1 shows a perspective view of a fluid-temperature testing assembly 10, in accordance with the preferred embodiment of the present invention, including a thermometer insert 20 engaging a container 22. The thermometer insert 20 includes an elongated backing member 24 and a thermal scale member 26. The elongated backing member 24 includes a backing front 28 and a backing back 30. The thermal scale member 26 includes numeric temperature indicia 32, and a temperature indication region 34. The container 22 includes a container wall 36 that defines a container cavity 37 and a container opening 38 that provides access to the container cavity 37.

Figure 2:
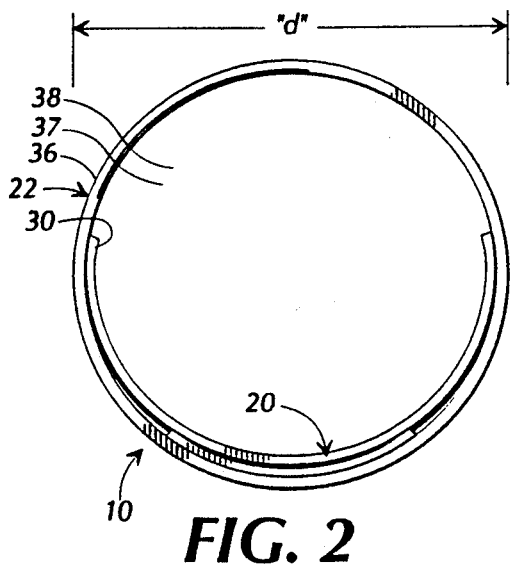
FIG. 2 is a top view of the fluid-temperature testing assembly of FIG. 1.

FIG. 2 shows a top view of FIG. 1. FIG. 2 shows that the container wall 36 defines a container diameter "d". FIG. 2 further shows that the thermometer insert 20 is in the container cavity 37 and is adjacent to and engaging the container wall 36. As is discussed below, the thermometer insert 20 and the container wall 36 cooperate to maintain the thermometer insert 20 adjacent to the container wall 36. In the preferred embodiment, the thermal scale member 26 is engaging the container wall 36 and is adhesively secured to the backing front 28. Portions of the backing front 28 are engaging the container wall 36.

Figure 3:
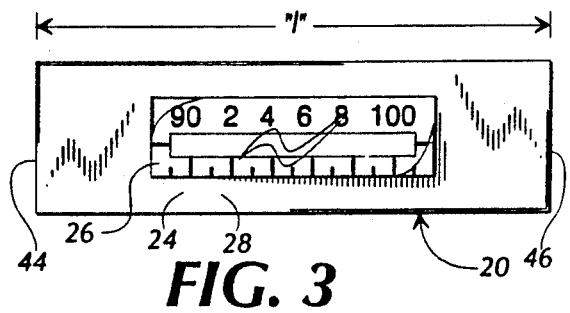
FIG. 3 is a front view of a thermometer insert, in accordance with the preferred embodiment of the present invention.
Figure 4:
FIG. 4 is a top view of the thermometer insert of FIG. 3.

FIG. 3 shows a front view of the thermometer insert 20 and further shows that the elongated backing member 24 defines a thermometer insert length "1". Also shown is a first backing edge 44 and a second backing edge 46 that is opposite the first backing edge 44. FIG. 4 is a top view of the thermometer insert 20 of FIG. 3, according to the preferred embodiment.

The preferred processes of manufacturing and assembling the thermometer insert 20 of the preferred embodiment of the present invention involves first manufacturing the elongated backing member 24 and the thermal scale member 26. Then, the thermometer insert 20 is assembled by adhesively mounting the thermal scale member 26 upon the backing front 28. Once the thermometer insert 20 is assembled, a container 22 is obtained for use with the thermometer insert 20.

In accordance with the preferred embodiment of the present invention, it is important that the thermometer insert 20 and the container 22 be properly sized to ensure that the thermometer insert 20 and the container wall 36 cooperate as is discussed below. In the preferred embodiment of the present invention, the thermometer insert length "1", which is defined by the length of the elongated backing member 24, is greater than the container diameter "d". In accordance with the preferred embodiment of the present invention, one example of an acceptable insert length "1" and container diameter "d" is 3 inches and 1.625 inches, respectively.

In accordance with the preferred embodiment of the present invention, the elongated backing member 24 is especially chosen to ensure that the thermometer insert 20 and the container wall 36 cooperate as is discussed below. The elongated backing member 24 is especially chosen for its resilient characteristic which tends to cause the elongated backing member 24 to "spring" back to its normally flat condition, if bent. Preferably, the elongated backing member 24 is a strip of thin, strong, semi-rigid, normally flat, resilient film material, such as that material sold under the trademark "MYLAR". In the preferred embodiment, the thickness (and, thus, resilient strength) of the elongated backing member 24 is chosen in cooperation with the size of the container; for example, the smaller the diameter "d", the less thick the elongated backing member 24, and visa-versa.

According to the preferred embodiment of the present invention, the thermal scale member 26 is a thermochromic device which includes liquid crystals, thermochromic inks, or other temperature indicating materials. The construction and use of the preferred thermochromic devices are considered known in the industry and require no explanation here. Temperature ranges are considered matters of choice and are selected according to the target range for the anticipated use. Examples of an acceptable thermal scale member 26, according to the preferred embodiment of the present invention, are the LCS200, LCS208, and LCS209 strip thermometers presently sold by Liquid Crystal Sciences, Inc. of Atlanta, Ga.

The construction and use of containers 22 is considered known in the industry and requires no further explanation here. In accordance with the preferred embodiment of the present invention, the insulative characteristics of the container wall 36 are not of importance. However, in the preferred embodiment of the present invention it is important that the container wall 36 be at least somewhat transparent. As is discussed above and below, it is also important that the container 20 be properly sized relative to the thermometer insert 20. Acceptable containers 22 include, but are not limited to, types for testing, collection, storage, and transport. Acceptable containers 22 further include single use and multiple use types, with or without provisions for closure. One example of an acceptable container 22 is a clear, plastic, open-mouthed specimen collection bottle.

Regarding the preferred method of measuring the temperature of a liquid (for example, urine) utilizing the thermometer insert 20 of the preferred embodiment of the present invention, there are several alternatives. The first alternative is to (i) place the liquid into the container 22, (ii) place the thermometer insert 20 into the container 22, and (iii) read the temperature indicated by the thermometer insert 20. The second alternative is to (i) place the thermometer insert 20 into the container 22, (ii) place the liquid into the container 22, and (iii) read the temperature indicated by the thermometer insert 20. After use, the fluid temperature testing assembly 10 can be discarded or reused. Alternatively, the thermometer insert 20 is capable of being removed from the container 22 to allow either the thermometer insert 20 or the container 22 to be reused.

Referring to FIG. 1, in the preferred embodiment of the present invention, the thermometer insert 20 is placed into the container 22 such that the thermometer insert 20 is positioned with the backing front 28 and thermal scale member 26 adjacent to the container wall 36. This placement allows for observation of the thermal scale member 26 directly through the container wall 36. In order to place the thermometer insert 20 within the container 22 as shown in FIG. 1, the thermometer insert 20 must be bent or bowed. Bending is accomplished by drawing the first backing edge 44 toward the second backing edge 46 until a portion of the backing back 30 located near the first backing edge 44 contacts a portion of the backing back 30 located near the second backing edge 46. Then the thermometer insert 20 is passed at least partially through the container opening 38 and held at least partially within the container cavity 37. While the thermometer insert 20 is at least partially within the container cavity 37, the thermometer insert 20 is oriented properly and then released so that the thermometer insert 20 orients as shown in FIG. 1. If the thermometer insert 20 ends up oriented higher in the container 22 than is shown in FIG. 1, or above the liquid in the container 22, the thermometer insert 20 is engaged and pushed to a lower point in the container cavity 37. The proper orientation referred to above would become understood by one reasonably skilled in the art after obtaining a proper thermometer insert 20 and container 22, and upon following the directions indicated above.

The cooperation between the thermometer insert 20 and the container wall 36 that causes the thermometer insert 20 to affix to the container wall 36 is due to the resilience of the elongated backing member 24 and the fact that the thermometer insert length "1" is sufficiently greater than the container diameter "d". When the bent thermometer insert 20 is released within the container cavity 37 the resilient characteristic of the elongated backing member 24 causes the thermometer insert 20 to seek the flattest possible shape. When the thermometer insert 20 is properly oriented within the container cavity 37 prior to the release, the flattest possible shape the thermometer insert 20 can achieve is the shape of the container wall 36 and thus the thermometer insert 20 moves adjacent to the container wall 36. As the resilient nature of the elongated backing member 24 attempts to return the thermometer insert 20 to a flatter shape than is allowed by the container wall 36, the thermometer insert 20 forces itself securely against and affixes to the container wall 36.

Figure 5:
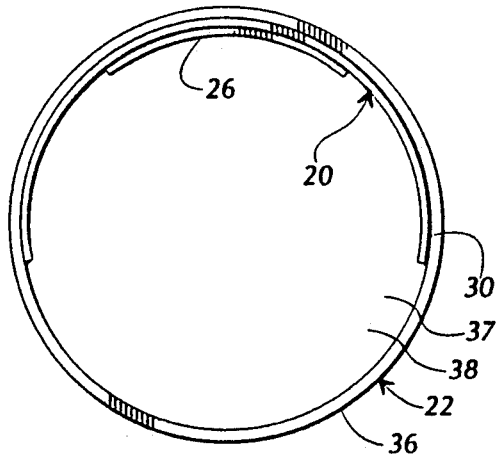
FIG. 5 is a top view of a fluid-temperature testing assembly, in accordance with an alternate embodiment of the present invention.

In accordance with an alternate embodiment of the present invention (see FIG. 5), the thermometer insert 20 is placed into the container 22 such that the thermometer insert 20 is positioned with the backing back 30 adjacent to the container wall 36 and the thermal scale member 26 opposite from the container wall 36. In other words, the backing back 30 is disposed (i.e., sandwiched between) the container wall 36 and the thermal scale member 26. In this alternate embodiment of the present invention, the thermal scale member 26 is preferably observed through that portion of the container wall 36 that is substantially opposite from the portion of the container wall 36 engaging the backing back 30, and then through the liquid in the container cavity 37. In order to place the thermometer insert 20 within the container 22 in accordance with this alternate embodiment, the thermometer insert 20 is bent by drawing the first backing edge 44 toward the second backing edge 46 until a portion of the backing front 28 located near the first backing edge 44 contacts a portion of the backing front 28 located near the second backing edge 46. Then the thermometer insert 20 is inserted into and released within the container 22 in the manner described above.

Figure 6:
FIG. 6 is a top view of a thermometer insert, in accordance with an alternate embodiment of the present invention.

In accordance with another alternate embodiment, the thermometer insert 20 is manufactured as a single unit with the thermal scale member 26 being formed directly within the elongated backing member 24. Thus, the thermometer insert 20 would appear, in edge view, in uniform thickness (see FIG. 6). The manufacture of such a single unit is considered well understood in the art.

While the embodiments of the present invention which have been disclosed herein are the preferred forms, other embodiments of the apparatus and method of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative dimensions and relationships shown on the drawings are given as the preferred relative dimensions and relationships, but the scope of the invention is not to be limited thereby.

I claim:

1. A method of measuring temperature within a container, said method comprising the steps of:
   providing a container including, at least, a container wall bounding a container cavity and defining an access aperture that allows access to and from the container cavity;
   providing a thermometer insert component that is resilient and biased toward a flat configuration;
   removably engaging the thermometer insert component to the container wall within the container cavity, wherein said step of removably engaging includes, at least, the steps of,
   bending the thermometer insert component, inserting the thermometer insert component through the access aperture and into the container cavity, releasing the thermometer insert component, and allowing the resilient nature of the thermometer insert component to cause the thermometer insert to affix to the container wall within the container cavity; and observing the thermometer insert component through the container wall.

2. A method of measuring temperature within a container, said method comprising the steps of:

providing a container including, at least, a container wall bounding a container cavity, wherein the container wall defined a container cavity diameter and an access aperture that allows access to and from the container cavity;

providing a thermometer insert component that is resilient and biased toward a flat configuration, and defines a length that is greater than the container cavity diameter;

removably engaging the thermometer insert component to the container wall within the container cavity, wherein said step of removably engaging includes, at least, the steps of, bending the thermometer insert component, inserting the thermometer insert component through the access aperture and into the container cavity, orienting the thermometer insert component in a manner that will facilitate the engaging of the thermometer insert component to the container wall within the container cavity, releasing the thermometer insert component, and allowing the resilient nature of the thermometer insert component, in combination with the length of the thermometer insert component and the container cavity diameter, to cause the thermometer insert to affix to the container wall within the container cavity; and observing the thermometer insert component through the container wall.

* * * * *